Jan. 16, 1940.                F. G. WINSLOW                2,187,217
                                PIPE JOINT
                           Filed June 29, 1938
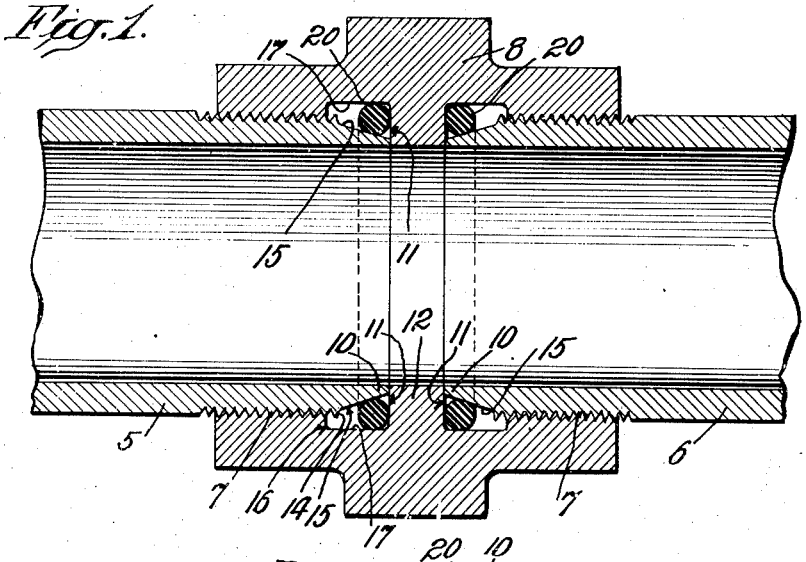
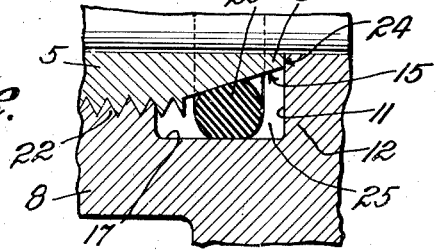
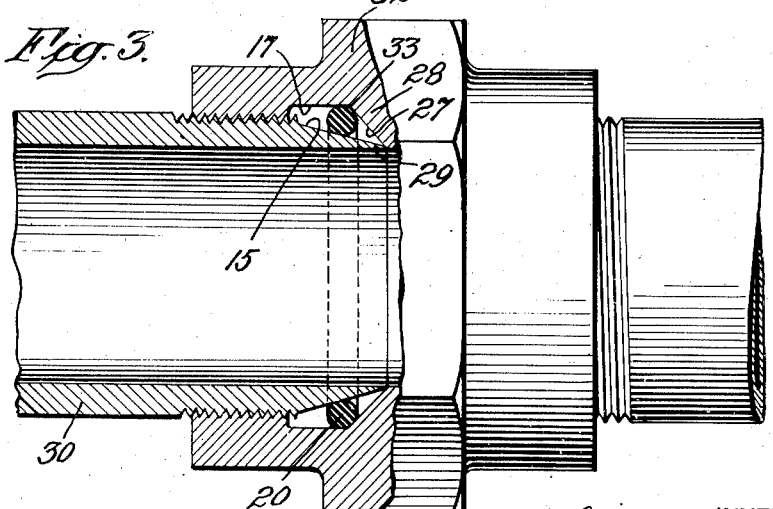

Patented Jan. 16, 1940

2,187,217

UNITED STATES PATENT OFFICE 2,187,217

PIPE JOINT

Francis Gordon Winslow, Pompton Lakes, N. J., assignor to American Hard Rubber Company, New York, N. Y., a corporation of New York Application June 29, 1938, Serial No. 216,415

3 Claims. (Cl. 285—157)

The invention relates to an improvement in pipe joints, and more particularly to an improvement in sealing means for pipe joints formed by cooperating standard threads, that is to say, threads which are of substantially the same diameter throughout their length.

Difficulty is frequently experienced in preventing the leakage of gases or liquids under pressure through the joint formed by cooperating external and internal standard threads, even when paint, lead, cement or other plastic filling is used between the cooperating threads. Accordingly, it is common practice in order to obtain as tight a threaded pipe joint as possible to taper the cooperating threads, and such threads are commonly termed pipe threads. But it is not expedient in all cases to employ pipe threads, and accordingly, it has been necessary to provide means for sealing the joints between external and internal standard threads other than the usual cementitious thread fillers now commonly employed to effect a tight joint.

The object of the present invention is to provide means for rendering unleakable the joint between cooperating standard threads used in pipe connections without the use of plastic sealing substances. To this end the invention consists in providing effective sealing means involving an annular gasket occupying an annular gasket receiving chamber with converging walls located between the thread joint and the fluid, whether gaseous or liquid, under pressure. The improvement is more fully described hereinafter and is particularly pointed out in the appended claims.

In the accompanying drawing illustrating the preferred form of the invention, Fig. 1 is a longitudinal section through two pipes threaded into a flanged coupling and embodying the improved sealing means for the thread joint; Fig. 2 is an enlarged detail section of the improved pipe joint with the sealing means under conditions of use; and Fig. 3 is a section similar to Fig. 1, but partly in side elevation, of a modified form of the improved pipe joint.

In its essential features the improved sealing means for pipe joints comprises an external tubular member having an inwardly extending circular abutment with an adjacent circumferential groove, and an internal tubular member screwed into one end of the external member and abutting at its extremity against the abutment, the internal tubular member being provided on its periphery opposite the bottom of the groove with a plane or flat surface which cooperates with the bottom of the groove to constitute tapered side walls of an annular gasket receiving chamber converging toward the joint between the threads, the adjacent surface of the abutment constituting another wall of the gasket receiving chamber. If the improved sealing means for pipe joints is to be employed in lines in which the fluid passing through the line is always under pressure the side walls of the annular gasket receiving chamber need taper or converge only toward the thread or pipe joint, but in those lines which are employed sometimes for the passage of fluids under pressure and at other times for vacuum use, then the side walls of the annular gasket receiving chamber will converge both toward the pipe joint and also toward the joint between the end of the internal member and the abutment.

The improved sealing means for pipe joints may be used in connection with any usual form of pipe and flange or coupling construction as exemplified by the pipes 5 and 6 provided at their outer ends with external standard or straight threads 7 screwed into corresponding internal threads in the outer ends of the flange or coupling member 8.

More specifically the improved sealing means for pipe joints embraces the following construction: Referring to the form of the invention shown in Fig. 1, the end or extremity 10 of each pipe abuts or fits snugly against the rim or lip of the wall surface 11 of a circular abutment 12 extending inwardly from the flange or coupling member 8. From the first external thread 14 to the extremity 10 of each pipe the outer surface or periphery of the pipe is tapered, as indicated at 15, to provide a flat or plane surface. From the point 16 in the flange 8, which extends outwardly somewhat beyond the first external thread 14 of the pipe, the flange is provided internally adjacent the wall 11 of the abutment with a circumferential groove the bottom of which is indicated at 17, and it will be noted that the bottom 17 of the groove is greater in diameter than the diameter of the cooperating threads. Thus the surface 15 of the periphery of the end of the pipe and the bottom 17 of the circumferential groove constitute the side walls of an annular gasket receiving chamber which taper or converge toward the threaded pipe joint and away from the wall 11 of the abutment 12 which constitutes a third wall of the chamber. In this chamber to form a tight joint between cooperating, converging side walls 15 and 17 of the chamber, is located a ring-like or annular gasket 20 of suitable, compressible material, which when it is not subjected to external pressure is substantially round in cross section, as shown in Fig. 1.

The internal and external diameters of the annular gasket 20 are such with respect to the walls 15, 17 and 11 constituting the annular gasket receiving chamber that it contacts with each of these surface walls when first placed in position in the chamber and is not distorted by the pressure of the fluid passing through the pipes 5 and 6. In Fig. 2 the improved sealing means for the pipe joint is shown under conditions of use and it will be observed that the annular gasket has moved longitudinally along the converging walls of the chamber toward the pipe joint, indicated at 22, and in doing so the parts thereof in contact with the wall 15 and the wall 17 have been compressed or flattened, thereby assuring a tight, unleakable joint at these points. It will be understood in this connection that the joint indicated at 24 between the extremity 10 of the pipe 5 and the adjacent wall 11 of the abutment 12 being formed by contacting surfaces of two elements composed of a durable substance, such as metal, fibre, hard rubber or the like, is not and can not be leak-proof to numerous fluids, both liquid and gaseous, under pressure. Hence the fluid which enters the space 25 between the annular gasket and the wall 11 of the abutment 12 forces the gasket longitudinally toward the pipe joint 22 and causes it to squeeze between the converging walls 15 and 17. In this connection it will be understood that both cooperating walls 15 and 17 may be tapered and also that the wall 15 may be parallel with the axis of the pipes and the bottom 17 of the groove tapered. For mechanical reasons it is preferred to taper the periphery of the pipe end.

The form of the invention shown in Fig. 3 is adapted for use not only in connection with pipe lines for the passage of fluid under pressure but also in connection with pipe lines employed in vacuum service. The parts which perform the same function as the corresponding parts in Figs. 1 and 2 are indicated by the same reference numerals. The modification consists in causing the wall 27 of the inwardly extending circular abutment 28 against which the tapered extremity 29 of the pipe 30 abuts to taper or converge outwardly and meet the wall 17 or bottom of the groove in the flange or coupling 32 at the apex 33 of an obtuse angle. Hence this construction provides an annular gasket receiving chamber the walls of which converge not only toward the pipe joint but also toward the joint between the extremity of the pipe and the internal abutment in the flange or coupling, with the result that when the line is under pressure the annular gasket 20 is compressed between the walls 17 and 15 and when the line is under vacuum the annular gasket is compressed between the walls 27 and 15, assuring a tight threaded joint in the line whether it is used in either pressure or vacuum service.

From the foregoing description it will be understood that the improved sealing means for pipe joints of the present invention is adapted for application to pipe joints irrespective of the material of which the pipes and their cooperating coupling members are composed, whether of metal or thermoplastic or thermosetting materials, especially hard rubber. The improved sealing means for pipe joints finds particular use in connection with the plastic materials in which there is a greater expansion and contraction than there is in pipe joints made with metals or materials having a relatively low coefficient of expansion and contraction. The expansive nature of the gasket in conjunction with the converging walls of the gasket receiving chamber makes it possible to assure a leak-proof joint between the pipe and its coupling member, regardless of the materials of which these members are composed, and whether they are two pipes joined together by a coupling, or a pipe and a T, a pipe and an elbow, or the like.

Having thus described the invention, what I claim as new is:

1. A pipe joint comprising a tubular flange member provided at one end with an internal thread and having an inwardly extending circular abutment and a circumferential groove adjacent the abutment, a pipe provided on one end with an external thread screwed into the internal thread of the flange, the extremity of the pipe abutting against the abutment, the periphery of the end of the pipe being provided with a plane tapered surface which together with the bottom of the groove forms an annular gasket receiving chamber, with walls converging toward the thread joint, and an annular compressible gasket of less axial length and of less cross-sectional dimension than said chamber located in the chamber and contacting with the bottom of the groove and the tapered surface of the pipe and entirely confined within said chamber, said gasket being adapted to be moved longitudinally of the gasket-receiving chamber by the pressure of the fluid passing through the pipe and to be compressed by the converging sides of the chamber.

2. A pipe joint comprising a tubular flange member provided at one end with an internal thread and having an inwardly extending circular abutment, having an inclined wall, and a circumferential groove adjacent the abutment, a pipe provided on one end with an external thread screwed into the internal thread of the flange, the extremity of the pipe abutting against the abutment, the periphery of the end of the pipe being provided with a plane or flat surface which together with the bottom of the groove and the adjacent surface of the abutment forms an annular gasket receiving chamber the walls of which converge in both directions longitudinally of the pipe and the flange, and an annular compressible gasket of less cross-sectional dimension than said chamber located in the chamber, said gasket being adapted to be moved longitudinally of the gasket-receiving chamber for the pressure of fluid passing through the pipe and to be compressed by the converging walls of the chamber.

3. In a pipe joint, a coupling member and a pipe, there being an annular gasket-receiving chamber between portions of the opposed faces of the coupling and pipe with the coupling and pipe contacting each other at opposite ends of said chamber, the inner and outer walls of the chamber being relatively angled to provide wedging activities in a direction longitudinally of the coupling and pipe and an annular compressible gasket of less axial length and of less cross-sectional dimension than said chamber located in said chamber and contacting the inner and outer walls thereof, said gasket being adapted to be moved longitudinally of said chamber by the pressure of fluid passing through the pipe and to be compressed by the wedging activities of the inner and outer walls of the chamber.

FRANCIS GORDON WINSLOW.